(12) United States Patent
Denham

(10) Patent No.: US 6,537,005 B1
(45) Date of Patent: Mar. 25, 2003

(54) BLIND FASTENER

(75) Inventor: Keith Denham, Welwyn Garden (GB)

(73) Assignee: Textron Fastening Systems Limited (GB)

( * ) Notice: Subject to any disclaimer, the term of this patent is extended or adjusted under 35 U.S.C. 154(b) by 0 days.

(21) Appl. No.: 09/831,857

(22) PCT Filed: Nov. 22, 1999

(86) PCT No.: PCT/GB99/03862

§ 371 (c)(1),
(2), (4) Date: Oct. 18, 2001

(87) PCT Pub. No.: WO00/36309

PCT Pub. Date: Jun. 22, 2000

(30) Foreign Application Priority Data

Dec. 17, 1998 (GB) .............................................. 9827647

(51) Int. Cl.[7] .............................. F16B 13/04; F16B 13/06
(52) U.S. Cl. .............................. 411/42; 411/34; 411/43; 411/70
(58) Field of Search .............................. 411/34–38, 42, 411/43, 55, 69, 70

(56) References Cited

U.S. PATENT DOCUMENTS 3,937,123 A    2/1976  Matuschek 5,213,460 A  *  5/1993  Sadri et al. ............. 411/361 X
6,247,883 B1 *  6/2001  Monserratt ................ 411/43 X

FOREIGN PATENT DOCUMENTS

| EP | 0286244 | 10/1988 |
| EP | 0705986 | 4/1996 |
| GB | 830447 | 3/1960 |

OTHER PUBLICATIONS

A copy of the International Search Report which issued during the International Phase of the present application.

* cited by examiner

*Primary Examiner*—Neill Wilson
(74) *Attorney, Agent, or Firm*—Trexler, Bushnell, Giangiorgi, Blackstone & Marr, Ltd.

(57) ABSTRACT

A blind fastener which can be installed by access to one side only of a workpiece comprises a pin, a sleeve, and an abutment member. The pin extends inside the sleeve and engages the sleeve at one end. The other end of the sleeve has a radially enlarged head. The sleeve is of one piece and has a radially expandable portion. The abutment member is adjacent to the sleeve head and abuts a frangible element of the sleeve head. The sleeve is inserted into an aperture in a workpiece with the expandable portion protruding beyond the blind face of the workpiece and the head abutting the near face of the workpiece. A pulling force is applied to the part of the pin extending beyond the abutment member and the expandable part of the sleeve expands radially to form a blind head against the blind face of the workpiece.

10 Claims, 11 Drawing Sheets

BLIND FASTENER

BACKGROUND OF THE INVENTION

The invention relates to a blind fastener, that is, one which can be installed by access to one side only of a workpiece. More particularly the invention relates to a blind fastener of the type comprising a pin, a sleeve, and an abutment member. In use of the fastener in a workpiece comprising two or more members to be secured together, the pin and sleeve are inserted through an aperture in the workpiece so that their remote end portions protrude beyond the remote or blind face of the workpiece. The application of axial compression to the sleeve by means of a pulling force on the pin with respect to the sleeve causes the protruding end portion of the sleeve to deform into a blind head which contacts the blind face of the workpiece. The workpiece is then compressed between the blind head and the abutment member and the abutment member is then secured to the pin, to secure the workpiece members together in the compressed condition. The creation and retention of this compression is important for the strength of the resulting joint.

There are alternative possible ways of providing the necessary mechanical engagement between the various component members of the fastener. The remote end of the pin may have a radially protruding head which contacts the end of the sleeve to apply compressive force to it, or the remote end of the pin may be in threaded engagement with the sleeve. The abutment member may be permanently securable to the near end portion of the pin by means of swaging, or may be removably secured by means of a threaded connection.

The application of an axial compressive force to the sleeve in order to form the blind head obviously requires that the near end of the sleeve is supported, in order to put it into axial compression. However, at a later stage in the installation process, when the workpiece is compressed between the abutment member and the blind head, it is important that none of this compressive force is supported by the sleeve, otherwise the compression applied to the workpiece would be reduced. These two design requirements are not straightforward to combine. At the same time it is also desirable that the fastener has as large a grip range as possible, that is to say that identical fasteners will successfully work in workpieces of different total thicknesses. This also imposes design constraints on the fastener. One way which has been used is to provide a shearable member between the abutment member and the near end of the sleeve, which initially supports sufficient axial compression on the sleeve to form the blind head, but fractures when the load applied between the abutment member and the sleeve increases. One such fastener is described in detail in EP 0705986 A and equivalent U.S. Pat. No. 5,603,592. However it is apparent from those documents that the construction of the fastener is complicated, involving a multiplicity of parts to be manufactured and assembled together. For instance, the sleeve is in two parts, and there are separate abutment, abutment securing, and shearable members. This increases the cost of manufacturing the fastener. Also, the head assembly of the fastener is of necessity deep, in order to accommodate both a useful grip range and the closing of any gap which may exist initially between the workpiece members.

OBJECTS AND SUMMARY OF THE INVENTION

The present invention aims to allow the provision of a fastener of simpler and smaller construction.

The invention provides, in one of its aspects, a blind fastener as set out in claim 1 of the accompanying claims. Further features of the invention are set out in claims 2 through 6. The invention includes a method of forming a riveted joint, as set out in claims 7 and 8. The invention also includes a riveted joint as set out in claim 9.

BRIEF DESCRIPTION OF THE DRAWINGS

A specific embodiment for the invention will now be described by way of example and with reference to the accompanying drawings, in which.

DETAILED DESCRIPTION OF THE INVENTION

The pin, sleeve and abutment member all have circular symmetry.

Figure 1:
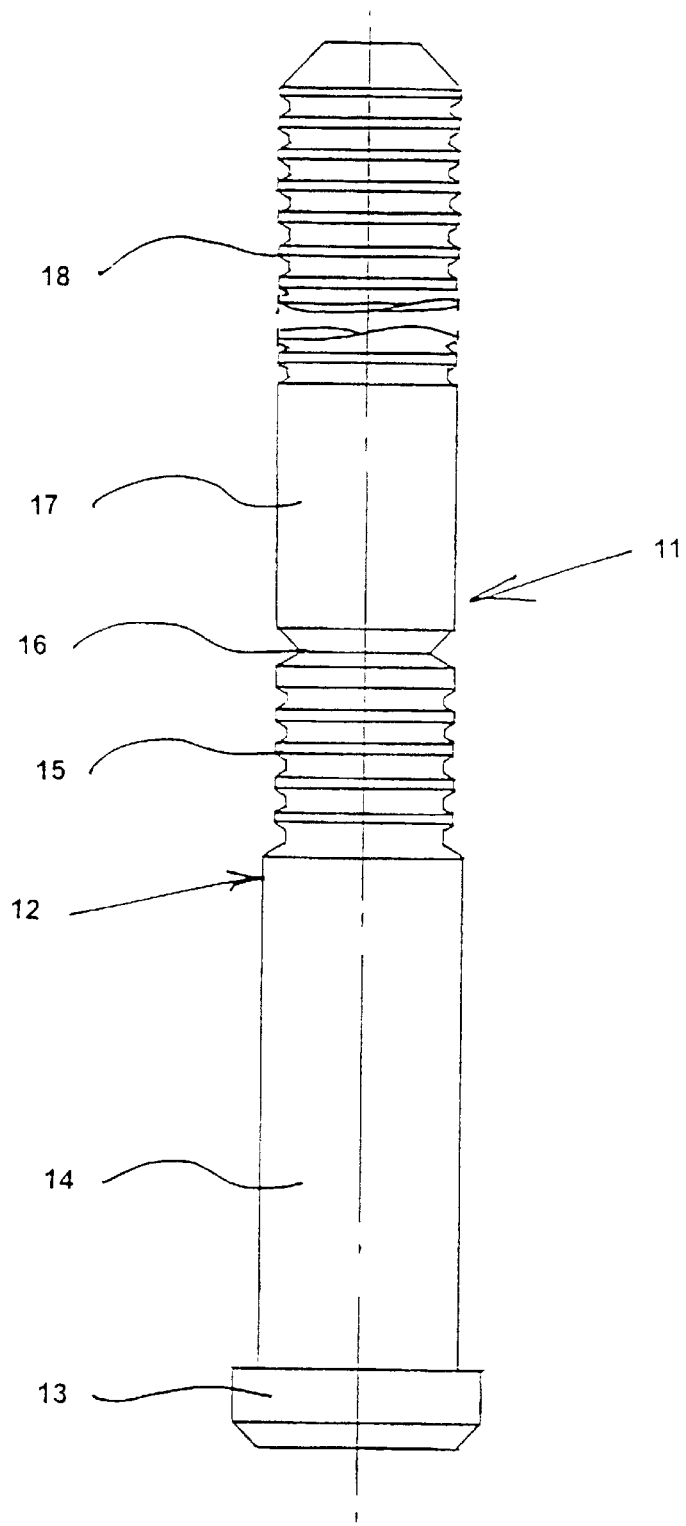
FIG. 1 is an outside elevation of the pin.

The pin 11 (FIG. 1) is of medium carbon steel and comprises an elongated cylindrical shank 12 with an integral radially enlarged head 13 at one end of the shank, by means of which the pin engages with one end of the sleeve. Adjacent the head 13 the pin shank has a plain portion 14, followed by a locking groove portion 15 and then a breakneck 16 which is the weakest part of the pin. Next to this there is another plain portion 17, followed by a pulling groove portion 18 (part shown broken away for conveniece of illustration), which grooves are for engagement by the jaws of the fastener installation tool. Such a form of pin is well known in the design and practice of fasteners of the pin and collar type, for example those commercially available under the Registered Trade Mark AVDELOK.

Figure 2:
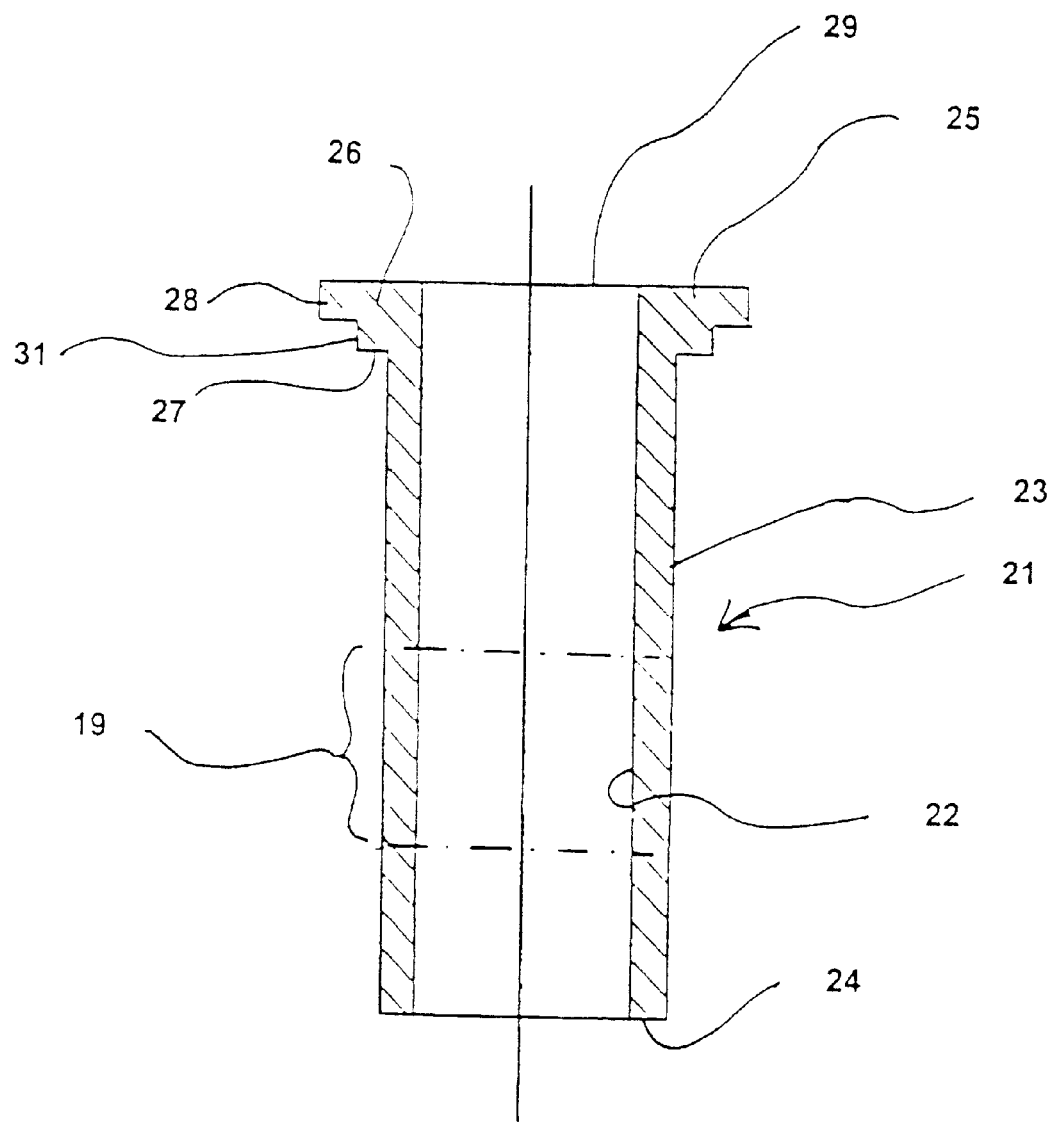
FIG. 2 is an axial section through the sleeve.

The sleeve 21 (FIG. 2) is generally cylindrical and is made of low carbon steel. It has a through bore 22 of uniform diameter which is a sliding fit on the pin shank 12, and a cylindrical shank 23 which is of uniform external diameter. At one end (the tail end) the sleeve shank has a flat end face 24 and at the other end (the head end) an integrally formed radially enlarged head 25. The sleeve head comprises a flange 26 having a flat annular underhead face 27. Formed integrally with the head flange 26 is a frangible element 28 in the form of a radially projecting flange which projects radially beyond the underhead face 27 and is also spaced axially from the underhead face 27. As illustrated in FIG. 2, the head flange and frangible flange have a common flat top face 29, but the frangible flange 28 is thinner than the head flange 26, thereby producing the aforementioned axial spacing between their lower faces, occupied by the outer circumferential face 31 of the lower part of the head flange 26.

The sleeve shank includes a radially expandable portion which is centred on a softened zone 19 which, as indicated in FIG. 2, in this example extends axially from a position about halfway along the length of the sleeve shank 21 to a position about three quarters of the way from the sleeve head 26 towards the sleeve tail 24. In this example, this softened portion 19 is made softer than the remainder of the sleeve by band annealing.

Figure 3:
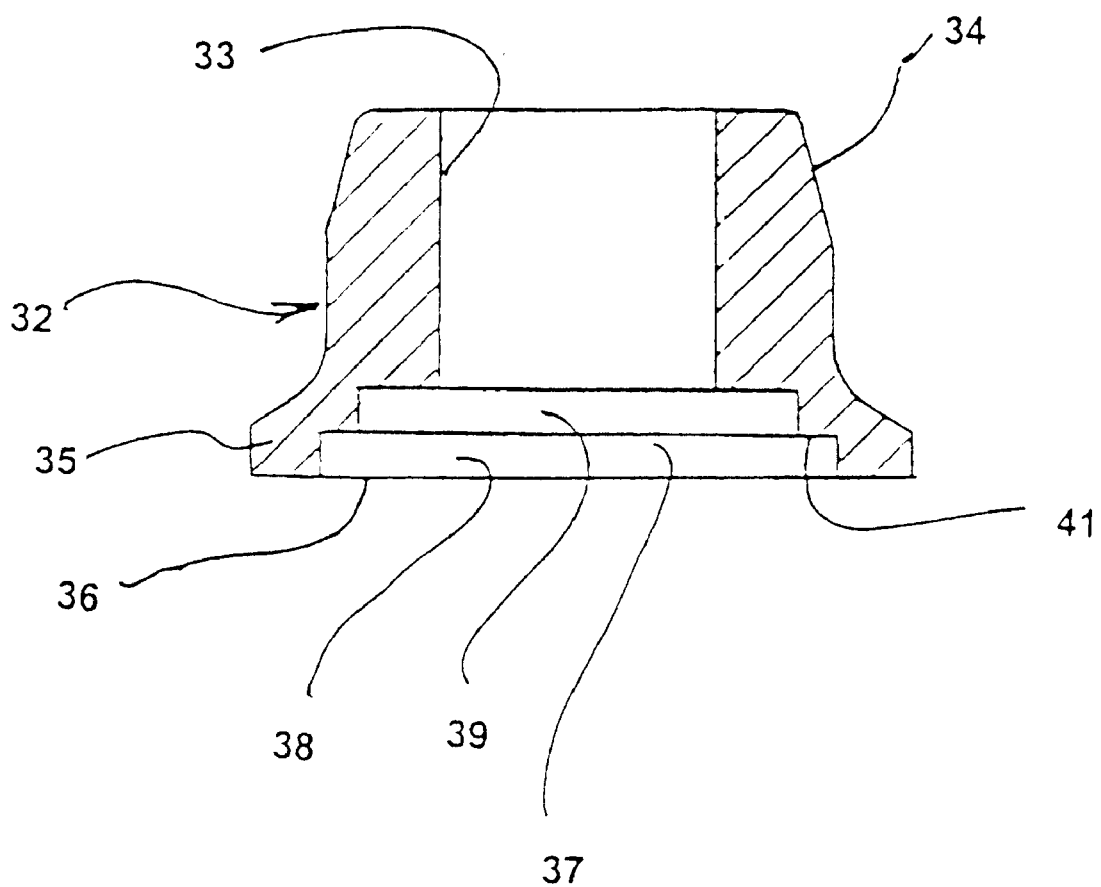
FIG. 3 is an axial section through the abutment member.

The abutment member (FIG. 3) is in the form of a collar 32 made of low carbon steel. It has a through bore 33 which is an interference fit on the pin shank 12. As is common with collars of the AVDELOK (Registered Trade Mark) type of fastener, the peripheral edge of the upper part of the collar has a bevel, whilst the lower end has a radially projecting flange 35. The bottom face 36 is flat, but is annular, since it is provided with a double recess 37. The recess 37 is generally circular on the axis of the collar, and comprises an outer recess 38 and an inner recess 39 of smaller diameter than the outer recess 38. The outer recess is of a diameter and depth suitable to receive the frangible flange 28 of the sleeve, having an annular bottom face 41 which surrounds the inner recess 39. This inner recess has a diameter suitable to receive the circumferential face 31 of the sleeve head, and the total axial depth of the two recesses is rather greater than the total axial thickness of the sleeve head 25.

Figure 4:
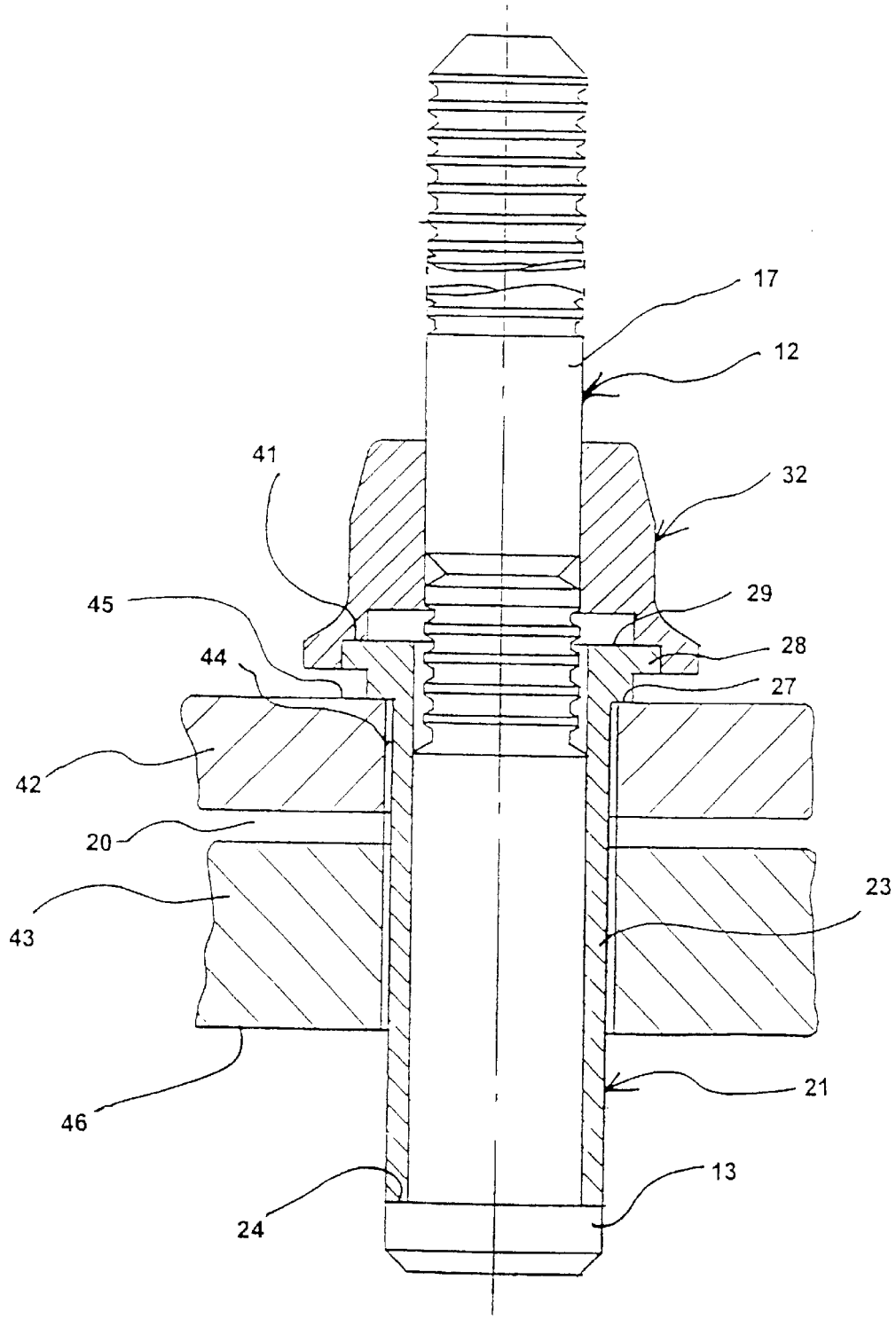
FIGS. 4 through 9 illustrate successive stages in the installation of the fastener in a workpiece, the workpiece, sleeve, abutment member and installation tool anvil being shown in section, and the pin being shown in elevation.

The pin, sleeve and collar are assembled together to form a fastener in the way illustrated in FIG. 4. The sleeve is assembled on the pin shank 12 so that the sleeve end face 24 abuts the annular face of the pin head 13, and the collar 32 is then assembled on the pin shank so that the annular recess face 41 abuts the sleeve head top face 29 on the radially protruding annular upper face of the frangible flange 28. The pin plain portion 17 protrudes from the top face of the collar 32. The collar is temporarily secured to the pin in this position by its interference fit on the pin shank, to prevent disassembly of the fastener during handling.

As also illustrated in FIG. 4, the fastener is used to secure together two structural metal panels 42, 43 which have a cylindrical aperture 44 through them in which the sleeve 21 is a clearance fit. In this example, the panels 42, 43 initially are spaced apart by a gap 20, which the fastener will close up before it secures the panels together. The total thickness of the workpiece formed by the panels 42 and 43 and the gap 20, is rather more than half of the length of the sleeve shank 23, so that the nearer end of the sleeve softened zone 19 indicated in FIG. 1 lies inside the remote face 46 of the workpiece when the underhead face 27 of the sleeve head contacts the near face 45 of the workpiece.

The fastener is now installed by applying a progressively increasing pull to the protruding part of the pin 11 in relation to the sleeve 21. This is done by means of a standard hydraulically-powered fastener placing tool, such as that commercially available under the designation AVDEL (Registered Trade Mark) Type 722, which is used for installing pin and collar type fasteners previously referred to.

The tool includes an annular anvil 47 (FIG. 5) having an internal throat 48 shaped appropriately to swage the collar 32. The tool also includes jaws (not shown) which engage with the pulling grooves in the portion 18 of the pin, and a hydraulic piston and cylinder device (not shown) for applying a progressively increasing retraction force to the jaws with respect to the anvil. Such tools and their manner of use are well known to those who use blind fasteners, and need not be described in detail here.

Figure 5:
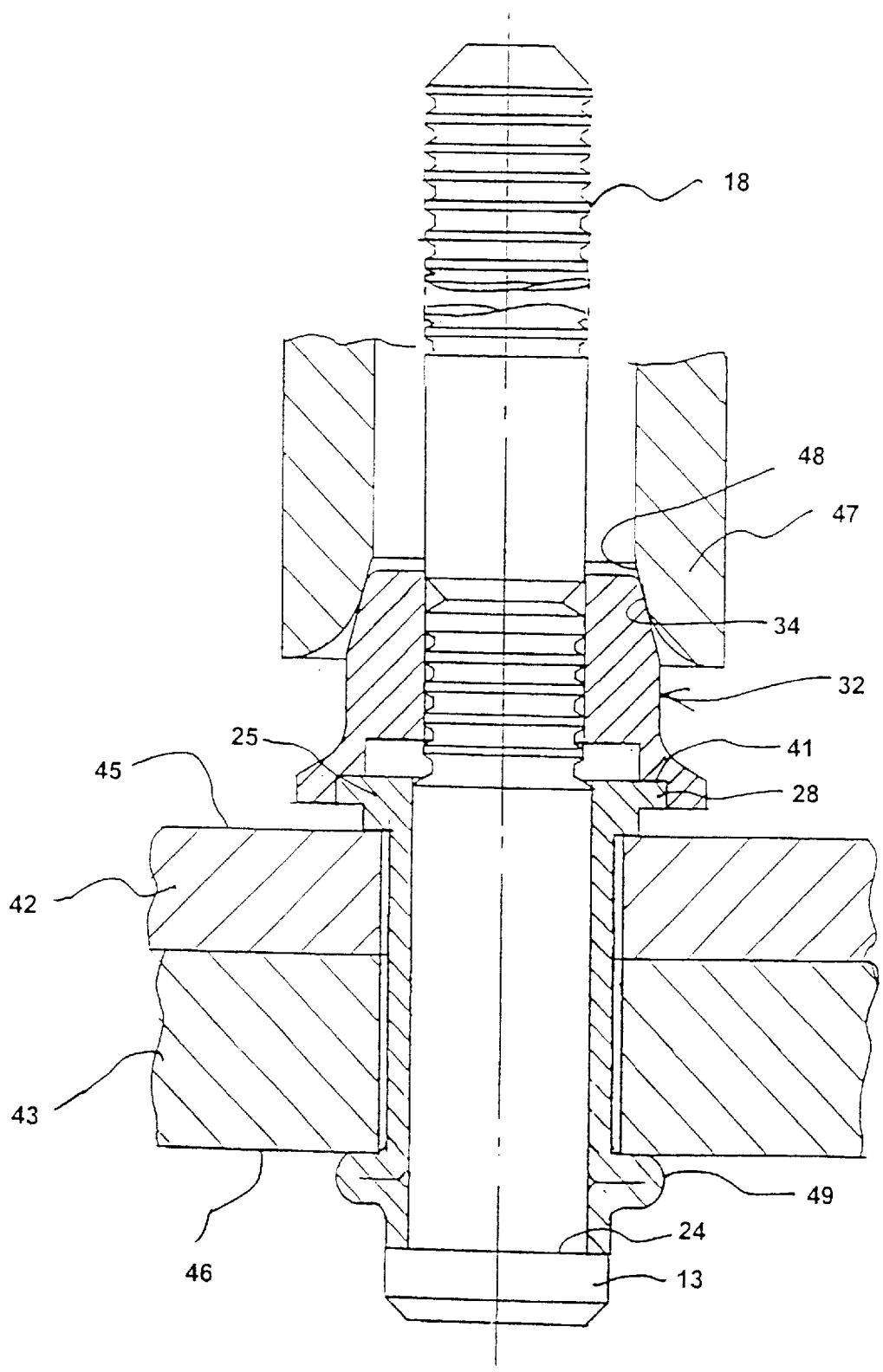

The tool is offered up to the protruding part of the pin, so that the outer end of the anvil throat contacts the top of the collar 32 around its bevel 34, as illustrated in FIG. 5. The tool is then actuated so that its jaws engage the pulling groove portion 18 of the pin and exert a progressively increasing pull on it with respect to the anvil 47. This reaction force is transmitted through the collar 32 to its recess annular face 41, and thence via the face of the frangible portion 28 of the collar to the sleeve. The collar is thus axially compressed between the face of the flange 28 and its end face 24 in contact with the pin head 13. The softened portion of the sleeve deforms by bulbing outwardly, to progressively form a blind head in contact with rear face 46 of the workpiece. As the blind head progressively forms, it exerts a compressive force on the rear face 46 of rear panel 43, which urges the panels 42, 43 together and so closes the gap 20 so that the panels are finally in contact with each other and compressed together between the sleeve head 25 and the blind head. The final form of the blind head, in this example, is illustrated at 49 in FIG. 5.

Figure 6:
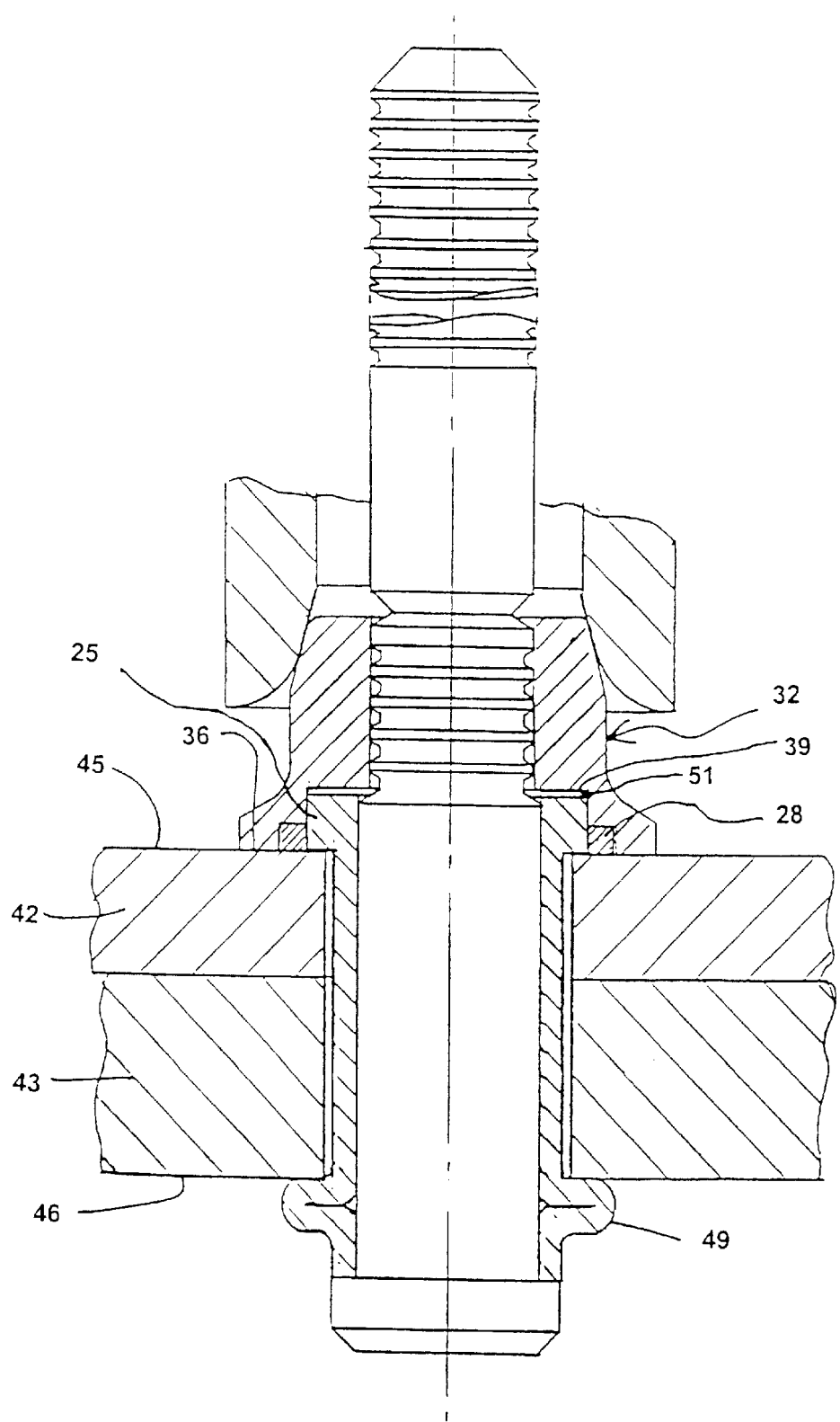

The frangible flange 28 is strong enough to support the force needed to fully form the blind head 49, but as the force on the collar 32 is further increased the frangible flange 28 shears off from the main body of the sleeve head 25. The collar 32 is driven down the pin shank towards the workpiece. Since the flange 28 is no thicker than the collar's outer recess 38, the underface 36 of the collar contacts the near face 45 of the workpiece, as illustrated in FIG. 6. Since the collars inner recess 39 and outer recess 38 have a total depth greater than the thickness of the sleeve head 25, there is a gap 51 above the sleeve head. Thus no axial loading can be applied to the sleeve head by the collar. Consequently, as the force applied by the installation tool continues to increase, all of the compression which it exerts is applied between the blind head 49 and the collar under face 36 to the workpiece, thus clamping the panels 42, 43 tightly together.

Figure 7:
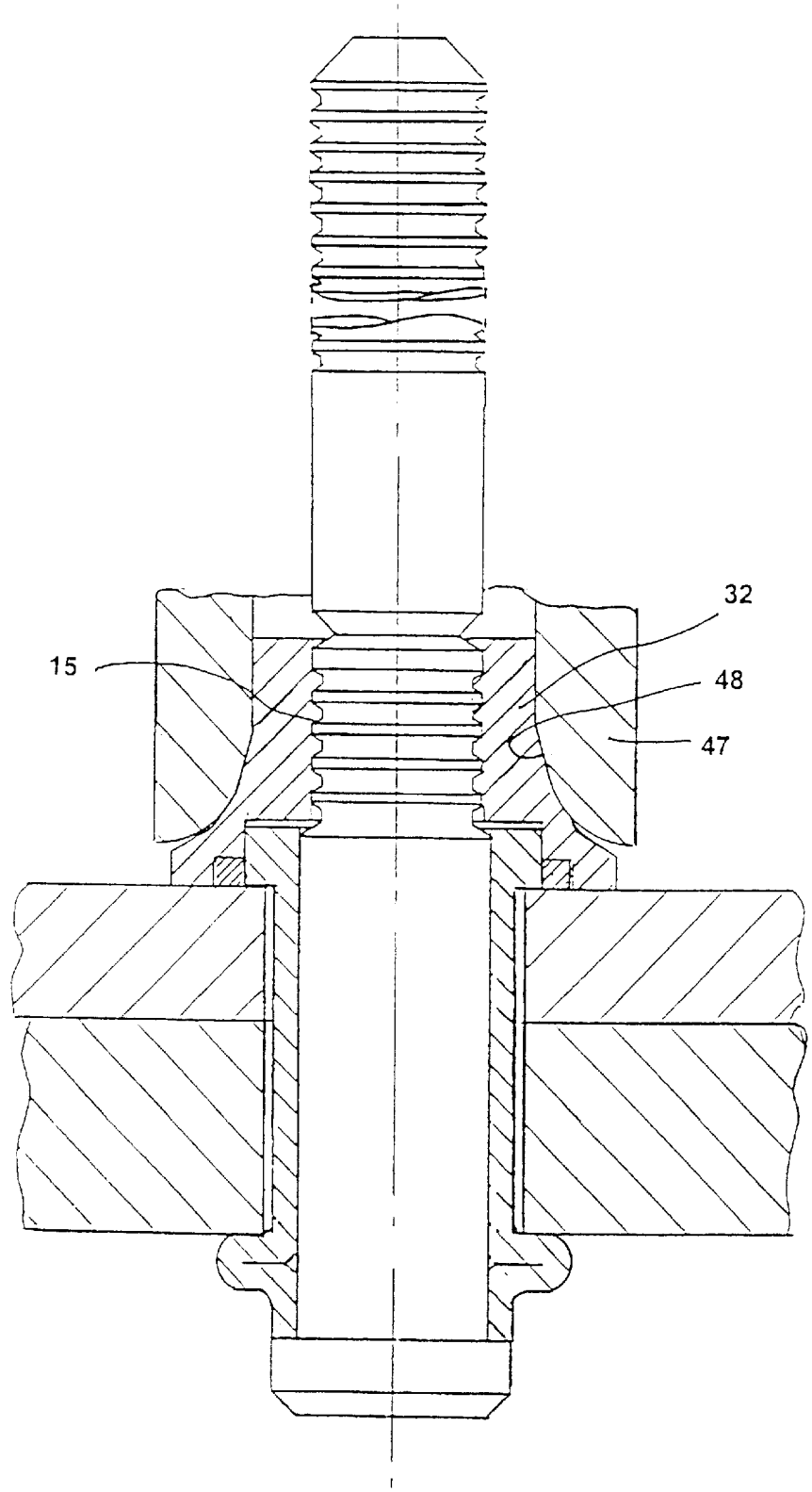

As the force applied by the tool further increases, the anvil 47 is pushed down over the exterior of the collar, so that the anvil throat 48 swages the collar 32 radially inwardly into the locking grooves 15 on the pin. The anvil stops with its lower face near the flange at the bottom of the collar. This position is illustrated in FIG. 7.

Figure 8:
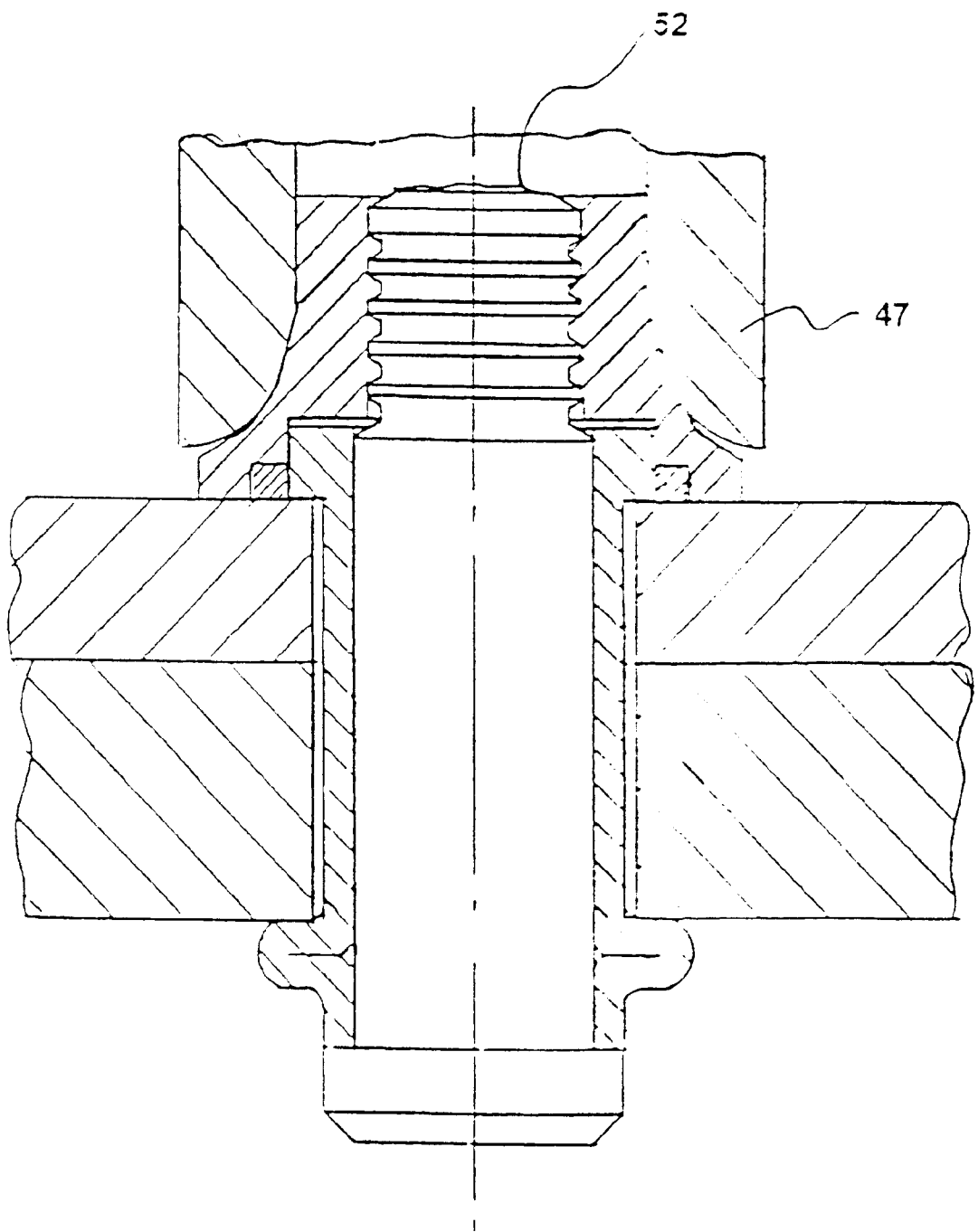
Figure 9:
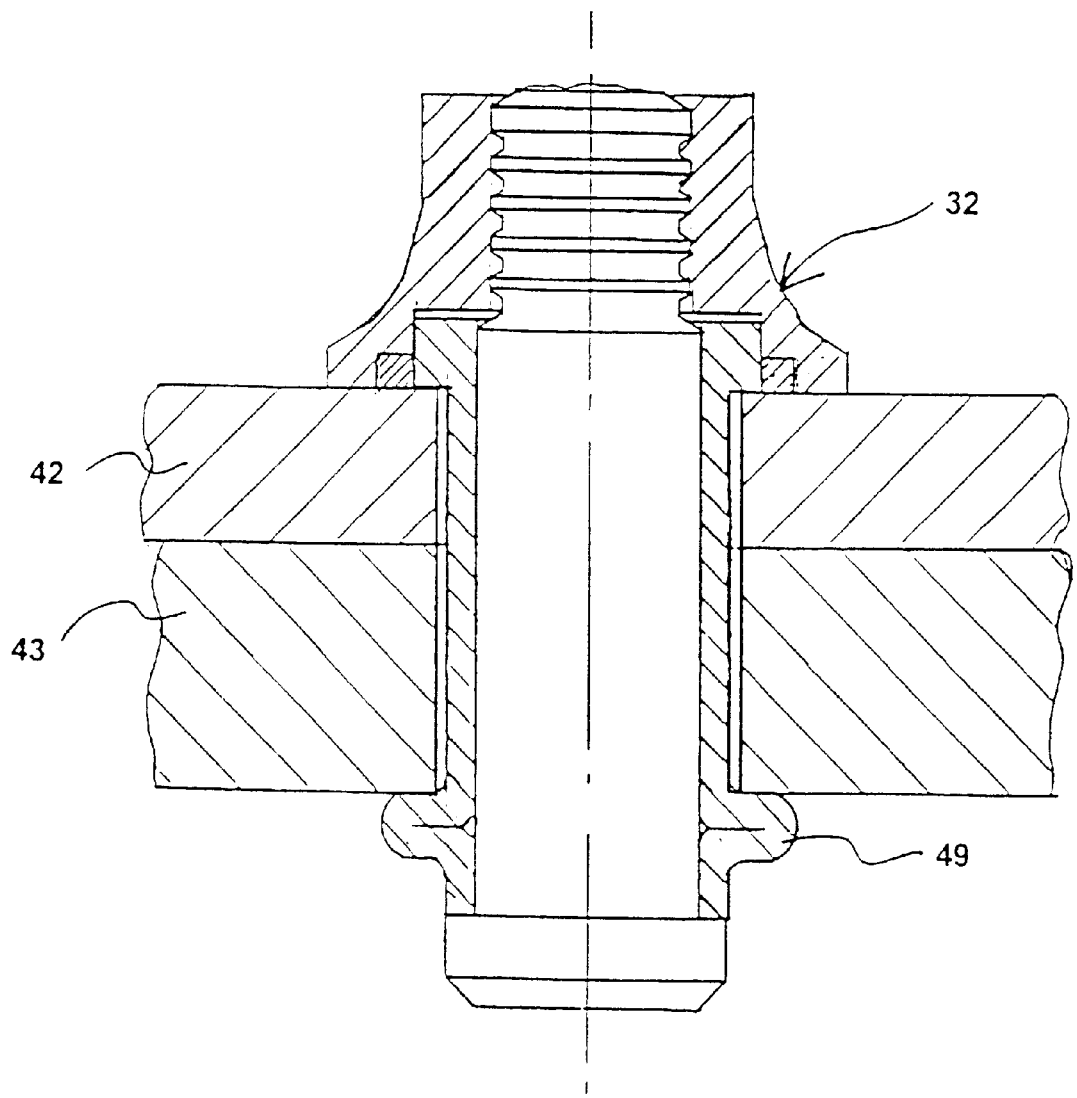

Further increase of the force applied by the tool causes the pin to break at the breakneck 16, the broken off pin tail being pulled away by the jaws, leaving a broken surface 52, as illustrated in FIG. 8. The tool is then removed, to leave the installed fastener, as illustrated in FIG. 9.

Figure 10:
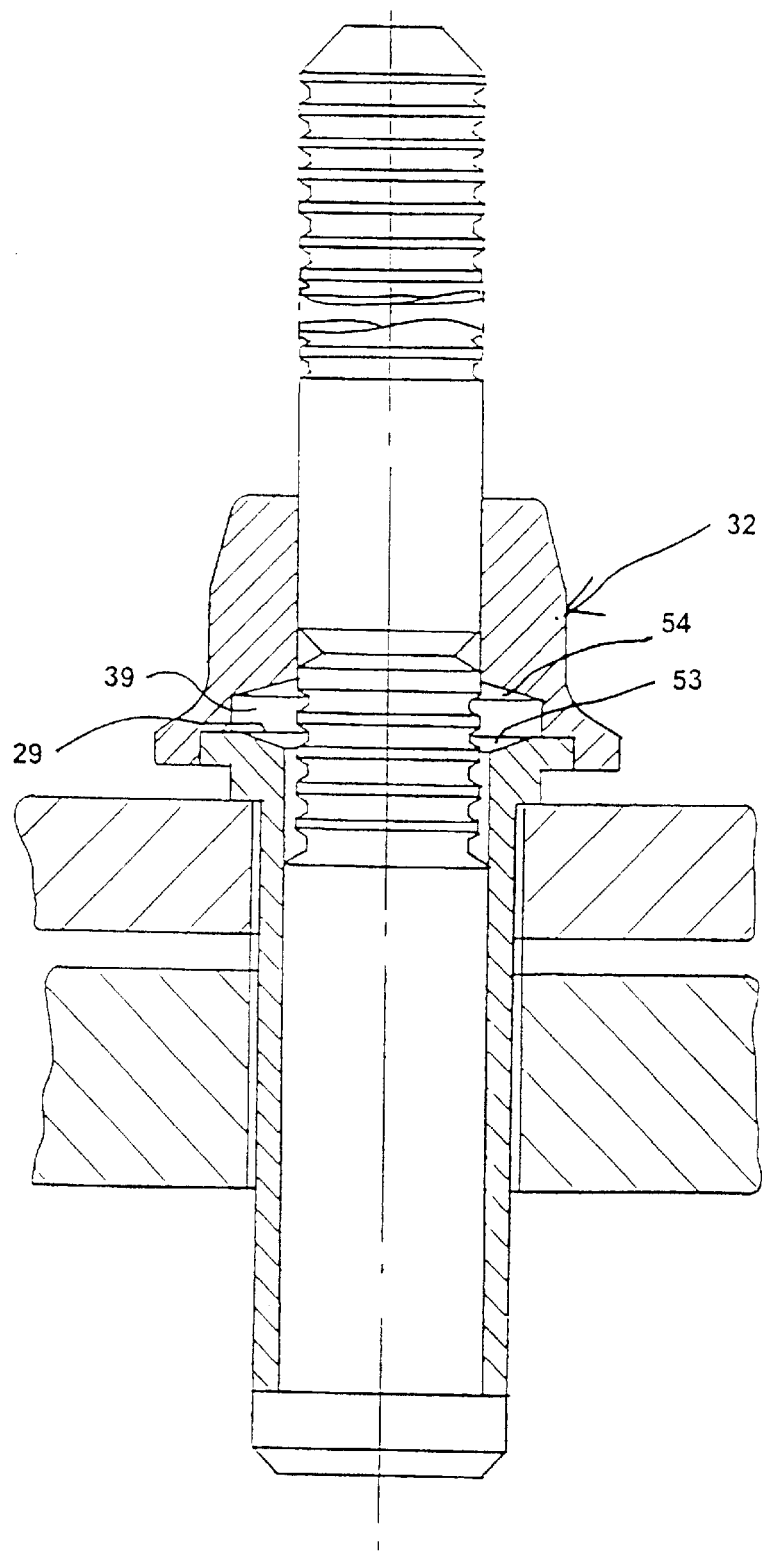
FIGS. 10 and 11 correspond to FIGS. 4 and 9 respectively, and illustrate a minor modification.
Figure 11:
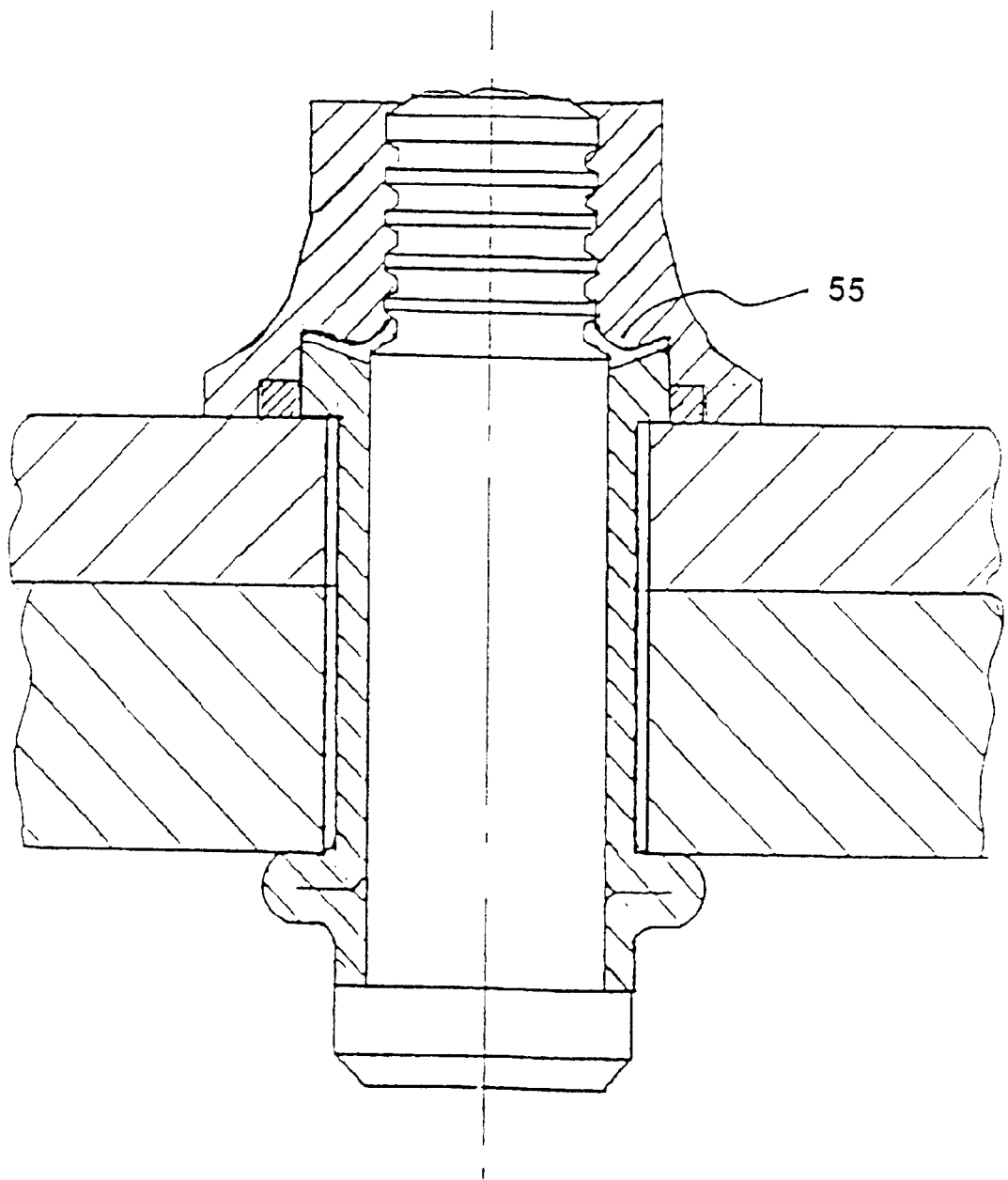

In certain circumstances it may be found that when the collar 32 is swaged on to the pin by the tool anvil 47, material of the collar is extruded towards the sleeve head 25. The modification shown in FIGS. 10 and 11 provides space to accommodate such extruded material. The upper face 29 of the sleeve head 25 is provided with a shallow conical recess 53, and the inner recess 39 at the bottom of the collar is provided with a shallow conical recess 54, as illustrated in FIG. 10 (which corresponds to FIG. 4). Thus as illustrated in FIG. 11 (which corresponds to FIG. 9) extruded material 55 from the collar is accommodated.

The fastener described in the foregoing example is advantageous over that described in prior art EP 0705986 A in that it comprises less parts, and is therefore less expensive to manufacture and assemble. Furthermore, the prior art fastener initially forms its blind head spaced apart from the rear face of the workpiece, and then pulls the sleeve into the workpiece so that the blind head engages the rear face of the workpiece. This requires the provision of a sufficiently long space within the abutment member to accommodate the end of the retracted sleeve. The length of retraction will increase with decreasing grip length. In the fastener of the present example, the blind head is formed in contact with the rear face of the workpiece, decreasing grip length and closure of any initial gap between the workpiece members being accommodated by increasing radial extent of the blind head, so that the overall length of the fastener can be reduced compared with the prior art.

The invention is not restricted to the details of the foregoing example. For instance, instead of the pin 11 being pulled into the sleeve 21 by a retracting jaw type of tool, it could be pulled in by a rotating nut arrangement similar to that described in EP 0705986 A. The abutment member 32 need not be permanently secured to the pin 11 but could be removably secured thereto, for example by means of a separate rotating nut arrangement, as also described in EP 0705986 A. The separate nut could be avoided by making the abutment member itself in threaded engagement with the pin.

The load at which the frangible element breaks can be controlled by selecting the area over which is initially integral with the sleeve head, for example by selecting the thickness of the frangible element 28, or by providing an annular groove, of the same diameter of the sleeve head 25, in the top face or the under face of the frangible element 28.

The frangible element 28 need not be integral with the sleeve head 25, but could be provided as a separate annular element, as also described in EP 0705986 A, although this would not be so advantageous in reducing the number of components.

In use of the fastener described in the foregoing example, it is not essential that the formation of the blind head is completed before breaking of the frangible member occurs, provided that it is completed before swaging of the abutment member collar to the pin occurs.

What is claimed is:

1. A blind fastener for insertion through an aperture in a workpiece, the fastener comprising a pin, a sleeve and an abutment member;

the pin extending inside the sleeve and engaging therewith at or near a first end of the sleeve;

the other end of the sleeve having a radially enlarged head;

the sleeve being in one piece and having a radially expandable portion adjacent the first end;

the abutment member being adjacent the head of the sleeve and projecting radially beyond the head and the pin extending beyond the abutment member;

the head of the sleeve being provided with a frangible element against which the abutment member abuts;

whereby, when the sleeve is inserted into a suitable aperture in a workpiece of suitable thickness with the expandable portion of the sleeve protruding beyond the blind or remote face of the workpiece and the head of the sleeve abutting the near face of the workpiece, with the abutment member abutting the frangible element of the sleeve head, the abutment member is thereby spaced away from the near face of the workpiece;

so that, when a progressively increasing pulling force is applied to the part of the pin extending beyond the abutment member, the pulling force being supported against the abutment member, so that axial compression is applied to the sleeve between the head and its engagement with the pin, initially the frangible element supports sufficient force to allow the radially expandable part of the sleeve to radially expand to begin to form a blind head in abutment with the remote face of the workpiece; and thereafter the frangible element breaks thereby to remove axial compression from the sleeve, and allows the abutment member to move along the pin to come into abutment with the near face of the workpiece, thereby to apply compression to the workpiece between the blind head and the abutment member; and thereafter the abutment member can be secured to the pin.

2. A blind fastener as claimed in claim 1, in which the abutment member has a recess to receive the head of the sleeve after the frangible element has broken, the axial extent of the recess being greater than the axial thickness of the sleeve head.

3. A blind fastener as claimed in claim 1, in which the frangible element is provided by a part which is spaced axially away from the workpiece-contacting face of the sleeve head.

4. A blind fastener as claimed in claim 1, in which the frangible element is provided by a part which extends radially outwardly beyond the workpiece-contacting part of the sleeve head.

5. A blind fastener as claimed in claim 1, in which the frangible element is formed integrally with the sleeve head.

6. A blind fastener as claimed in claim 1, in which the abutment member is permanently securable to the pin by deformation into engagement therewith.

7. A method of forming a riveted joint by means of a blind fastener comprising a pin, a sleeve and an abutment member;

the pin extending inside the sleeve and engaging therewith at or near a first end of the sleeve;

the other end of the sleeve having a radially enlarged head;

the sleeve being in one piece and having a radially expandable portion adjacent the first end;

the abutment member being adjacent the head of the sleeve and projecting radially beyond the head and the pin extending beyond the abutment member;

the head of the sleeve being provided with a frangible element against which the abutment member abuts;

whereby, when the sleeve is inserted into a suitable aperture in a workpiece of suitable thickness with the expandable portion of the sleeve protruding beyond the blind or remote face of the workpiece and the head of the sleeve abutting the near face of the workpiece, with the abutment member abutting the frangible element of the sleeve head, the abutment member is thereby spaced away from the near face of the workpiece;

so that, when a progressively increasing pulling force is applied to the part of the pin extending beyond the abutment member, the pulling force being supported against the abutment member, so that axial compression is applied to the sleeve between the head and its engagement with the pin, initially the frangible element supports sufficient force to allow the radially expandable part of the sleeve to radially expand to begin to form a blind head in abutment with the remote face of the workpiece; and thereafter the frangible element breaks thereby to remove axial compression from the sleeve, and allows the abutment member to move along the pin to come into abutment with the near face of the workpiece, thereby to apply compression to the workpiece between the blind head and the abutment member; and thereafter the abutment member can be secured to the pin, the method comprising:

inserting the sleeve and pin into the workpiece aperture so that the expandable portion of the sleeve protrudes beyond the blind or remote side of the workpiece and the head of the sleeve abuts the near face of the workpiece, with the abutment member abutting the frangible element of the sleeve head, the abutment member being spaced away from the near face of the workpiece;

and applying a progressively increasing pulling force to the part of the pin extending beyond the abutment member, the pulling force being supported against the abutment member, thereby applying axial compression to the sleeve between the head and its engagement with the pin, so that initially the frangible element supports sufficient force to allow the radially expandable part of the sleeve to radially expand and begin to form a blind head in abutment with the remote face of the workpiece; and thereafter the frangible element breaks and removes axial compression from the sleeve, and the abutment member moves along the pin to come into abutment with the near face of the workpiece, thereby to apply compression to the workpiece between the blind head and the abutment member;

and thereafter securing the abutment member to the pin.

8. A method as claimed in claim 7, in which securing of the abutment member to the pin is effected by deforming the abutment member into engagement with the pin.

9. A riveted joint which has been formed by means of a fastener, comprising a pin, a sleeve and an abutment member;

the pin extending inside the sleeve and engaging therewith at or near a first end of the sleeve;

the other end of the sleeve having a radially enlarged head;

the sleeve being in one piece and having a radially expandable portion adjacent the first end;

the abutment member being adjacent the head of the sleeve and projecting radially beyond the head and the pin extending beyond the abutment member;

the head of the sleeve being provided with a frangible element against which the abutment member abuts;

whereby, when the sleeve is inserted into a suitable aperture in a workpiece of suitable thickness with the expandable portion of the sleeve protruding beyond the blind or remote face of the workpiece and the head of the sleeve abutting the near face of the workpiece, with the abutment member abutting the frangible element of the sleeve head, the abutment member is thereby spaced away from the near face of the workpiece;

so that, when a progressively increasing pulling force is applied to the part of the pin extending beyond the abutment member, the pulling force being supported against the abutment member, so that axial compression is applied to the sleeve between the head and its engagement with the pin, initially the frangible element supports sufficient force to allow the radially expandable part of the sleeve to radially expand to begin to form a blind head in abutment with the remote face of the workpiece; and thereafter the frangible element breaks thereby to remove axial compression from the sleeve, and allows the abutment member to move along the pin to come into abutment with the near face of the workpiece, thereby to apply compression to the workpiece between the blind head and the abutment member; and thereafter the abutment member can be secured to the pin.

10. A riveted joint which has been formed by means of a blind fastener comprising a pin, a sleeve and an abutment member;

the pin extending inside the sleeve and engaging therewith at or near a first end of the sleeve;

the other end of the sleeve having a radially enlarged head;

the sleeve being in one piece and having a radially expandable portion adjacent the first end;

the abutment member being adjacent the head of the sleeve and projecting radially beyond the head and the pin extending beyond the abutment member;

the head of the sleeve being provided with a frangible element against which the abutment member abuts;

whereby, when the sleeve is inserted into a suitable aperture in a workpiece of suitable thickness with the expandable portion of the sleeve protruding beyond the blind or remote face of the workpiece and the head of the sleeve abutting the near face of the workpiece, with the abutment member abutting the frangible element of the sleeve head, the abutment member is thereby spaced away from the near face of the workpiece;

so that, when a progressively increasing pulling force is applied to the part of the pin extending beyond the abutment member, the pulling force being supported against the abutment member, so that axial compression is applied to the sleeve between the head and its engagement with the pin, initially the frangible element supports sufficient force to allow the radially expandable part of the sleeve to radially expand to begin to form a blind head in abutment with the remote face of the workpiece; and thereafter the frangible element breaks thereby to remove axial compression from the sleeve, and allows the abutment member to move along the pin to come into abutment with the near face of the workpiece, thereby to apply compression to the workpiece between the blind head and the abutment member; and thereafter the abutment member can be secured to the pin, the method comprising:

inserting the sleeve and pin into the workpiece aperture so that the expandable portion of the sleeve protrudes beyond the blind or remote side of the workpiece and the head of the sleeve abuts the near face of the workpiece, with the abutment member abutting the frangible element of the sleeve head, the abutment member being spaced away from the near face of the workpiece;

and applying a progressively increasing pulling force to the part of the pin extending beyond the abutment member, the pulling force being supported against the abutment member, thereby applying axial compression to the sleeve between the head and its engagement with the pin, so that initially the frangible element supports sufficient force to allow the radially expandable part of the sleeve to radially expand and begin to form a blind head in abutment with the remote face of the workpiece; and thereafter the frangible element breaks and removes axial compression from the sleeve, and the abutment member moves along the pin to come into abutment with the near face of the workpiece, thereby to apply compression to the workpiece between the blind head and the abutment member;

and thereafter securing the abutment member to the pin.

* * * * *